United States Patent
Wu

(10) Patent No.: US 9,970,631 B2
(45) Date of Patent: May 15, 2018

(54) ONE-WAY VISION WINDOW SYSTEM

(71) Applicant: BenQ Materials Corporation, Taoyuan (TW)

(72) Inventor: Fung-Hsu Wu, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 407 days.

(21) Appl. No.: 14/923,415

(22) Filed: Oct. 26, 2015

(65) Prior Publication Data
US 2016/0209006 A1    Jul. 21, 2016

(30) Foreign Application Priority Data

Jan. 20, 2015  (TW) .............. 104101804 A

(51) Int. Cl.
| | |
|---|---|
| *F21V 14/00* | (2018.01) |
| *G02B 27/14* | (2006.01) |
| *F21V 23/04* | (2006.01) |
| *F21Y 115/10* | (2016.01) |
| *F21Y 115/15* | (2016.01) |

(52) U.S. Cl.
CPC .......... F21V 14/003 (2013.01); G02B 27/142 (2013.01); G02B 27/144 (2013.01); *F21V 23/04* (2013.01); *F21Y 2115/10* (2016.08); *F21Y 2115/15* (2016.08)

(58) Field of Classification Search
CPC ...... G02B 26/02; G02B 27/144; G02F 1/1334
USPC ............................................................. 349/1
See application file for complete search history.

(56) References Cited

U.S. PATENT DOCUMENTS

| | | | |
|---|---|---|---|
| 7,356,969 B1* | 4/2008 | Yurth .................. | E06B 9/24 359/614 |
| 9,857,867 B2* | 1/2018 | Kumar ................. | G06F 3/005 |
| 2013/0009863 A1* | 1/2013 | Noda .................... | G06F 3/005 345/156 |
| 2014/0176528 A1* | 6/2014 | Robbins ............... | G02B 27/225 345/419 |

FOREIGN PATENT DOCUMENTS

| | | |
|---|---|---|
| TW | 236681 B | 12/1994 |
| TW | 201040596 A | 11/2010 |
| TW | 201144858 A | 12/2011 |

* cited by examiner

*Primary Examiner* — Hoan C Nguyen
(74) *Attorney, Agent, or Firm* — CKC & Partners Co., Ltd.

(57) ABSTRACT

A one-way vision system includes an indoor lighting, a light valve device, and a control module electrically connecting to the indoor lighting and the light valve device, and synchronously controlling power switch of the indoor lighting and switching frequency of the light valve device. Therefore, the higher brightness indoor still has an excellent effect of secret in the condition of lower brightness outdoors.

5 Claims, 3 Drawing Sheets

ONE-WAY VISION WINDOW SYSTEM

RELATED APPLICATIONS

This application claims priority to Taiwanese Application Serial Number 104101804, filed on Jan. 20, 2015, which is herein incorporated by reference.

BACKGROUND OF THE INVENTION

Field of the Invention

The invention relates to a one-way vision window system.

Description of the Related Art

Conventional one-way vision devices usually comprise a semi-transparent metal film structure or an opaque film structure containing a plurality of apertures. By the above structures, the light transmittance and light reflectance on the two sides of the conventional one-way vision devices are inconsistent; therefore, it is not easy to see the scene of the side which light reflectance is less than light transmittance from the other side which light reflectance is higher than light transmittance; however, with the change of light intensity of the environment of the two sides of the one-way vision devices, the one-way vision effect may decrease or disappear; for example, when the outdoors lighting is generally much lower than the indoor lighting in the evening, even if the outside windows has the conventional one-way vision device with higher light reflectance, there is no interference caused by the reflection of outdoor lighting; therefore, the brighter indoor scene can still be seen in the outdoors, and the indoor people's privacy will be affected. Therefore, the conventional one-way vision device cannot be applicable in such a situation; additional shelters, such as curtains and louvers, are used probably, but both indoor and outdoor scenes are unable to be seen accordingly. As the result, it still exists a need to provide a one-way vision window system with better anti-peeping effect in the situation of brighter indoors to improve the above issues.

SUMMARY OF THE INVENTION

In an embodiment of the present invention, a one-way vision window system includes an indoor lighting, a light valve device, and a control module electrically connecting to the indoor lighting and the light valve device, and synchronously controlling power switch of the indoor lighting and switching frequency of the light valve device, wherein the switching frequency is in a range of 60 Hz to 1000 Hz, and when the indoor lighting turns on, the light valve device is in an opaque state; when the indoor lighting turns off, the light valve device is in a transparent state.

In another preferred embodiment of the one-way vision window system of the present invention, the light valve device is a polymer-dispersed liquid crystal device, a polarizing dimming device or a refractive dimming device.

In further a preferred embodiment of the one-way vision window system of the present invention, the indoor lighting is light emitting diode (LED) or organic light emitting diode (OLED).

In still a preferred embodiment of the one-way vision window system of the present invention, the one-way vision window system further includes a semi transflective layer which disposed on a side of the light valve device with respect to the indoor lighting.

In further another preferred embodiment of the one-way vision window system of the present invention, the semi transflective layer is a metal thin-film layer, a glass beads layer or a high reflective porous layer.

In conclusion, the one-way vision window system of the present invention improves the disadvantage of the conventional one-way vision devices, which the one-way vision effect will decrease or disappear in the evening, and provides well anti-peeping effect in the situation of that outdoor lighting is much lower than indoor lighting, and the indoor people can see the darker outdoor scenes.

BRIEF DESCRIPTION OF THE DRAWINGS

The above and other aspects of the invention will become better understood with regard to the following detailed description of the preferred but non-limiting embodiment(s). The following description is made with reference to the accompanying drawings.

DETAILED DESCRIPTION OF THE INVENTION

Please note the drawings shown in the Figures are for illustrative purposes only and not to scale.

Figure 1:
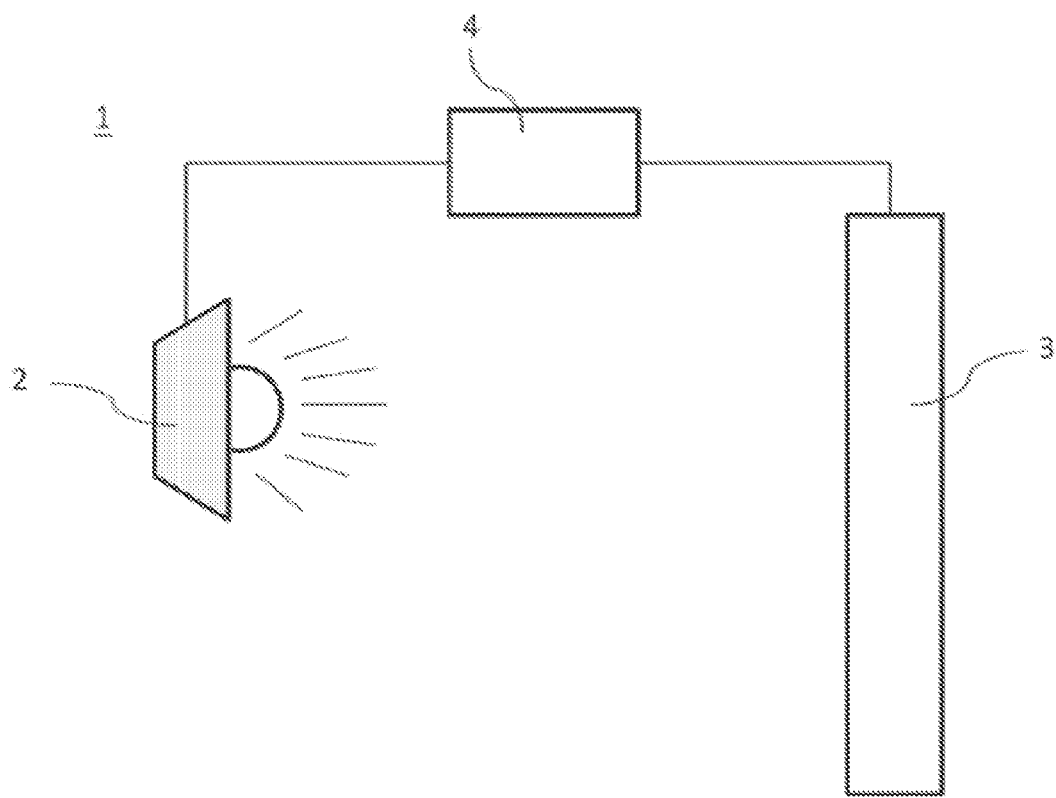
FIG. 1 shows the perspective views of the one-way vision window system of a preferred exemplary embodiment of the present invention.

Referring to FIG. 1, in an embodiment of the present invention, a one-way vision window system 1 includes a an indoor lighting 2, a light valve device 3, and a control module 4 electrically connecting to the indoor lighting 2 and the light valve device 3, and synchronously controlling power switch of the indoor lighting 2 and switching frequency of the light valve device 3, wherein the itching frequency is in a range of 60 Hz to 1000 Hz, and when the indoor lighting 2 turns on, the light valve device 3 is in an opaque state; when the indoor lighting 2 turns off, the light valve device 3 is in a transparent state.

In another preferred embodiment of the one-way vision window system of the present invention, the light valve device is a polymer-dispersed liquid crystal device, a polarizing dimming device and a refractive dimming device.

In further a preferred embodiment of the one-way vision window system of the present invention, the indoor lighting is LED or OLED which has very short driving time, and can be quickly switched.

Figure 2A:
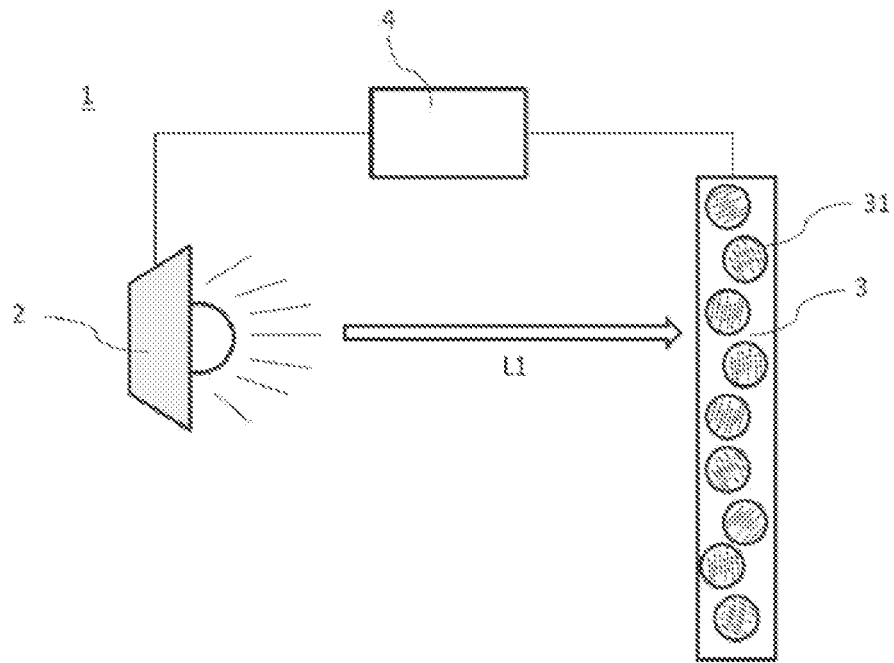
FIG. 2a and FIG. 2b illustrate the principle of the one-way vision window system of a preferred exemplary embodiment of the present invention.
Figure 2B:
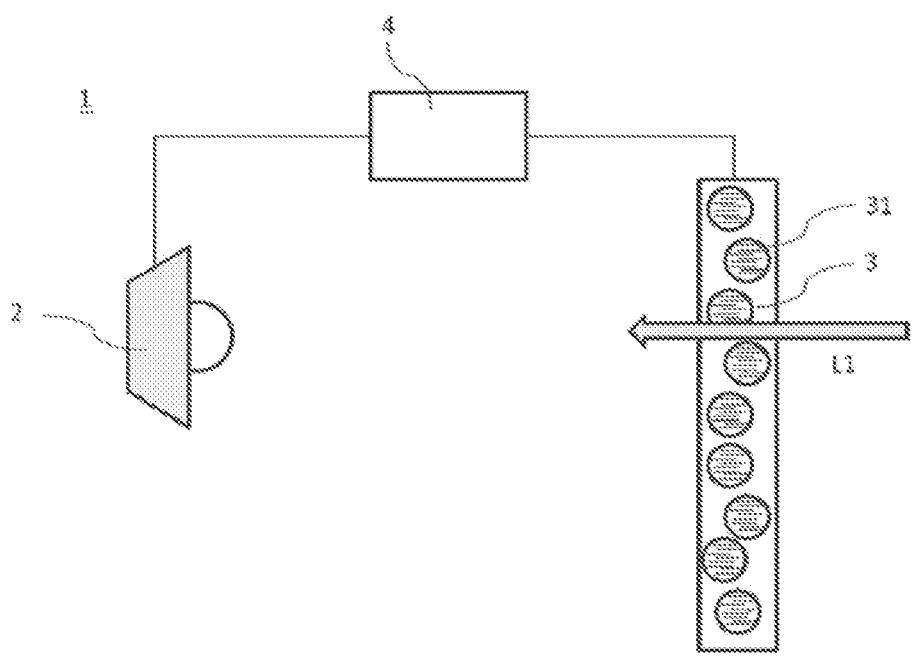
Figure 3:
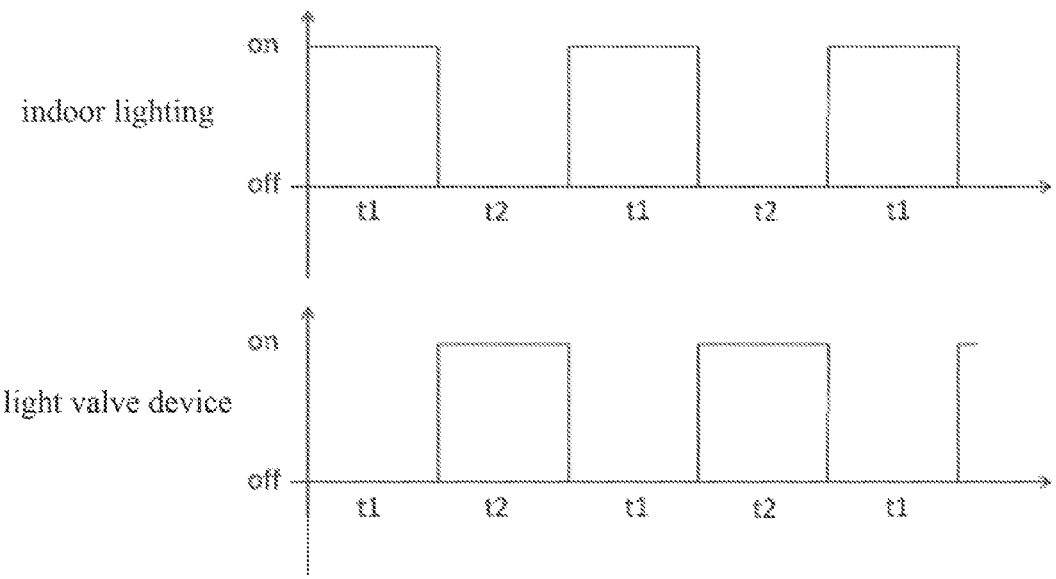
FIG. 3 shows the time sequence diagram of the control module of the one-way vision window system of a preferred exemplary embodiment of the present invention.

Referring to FIG. 2a and FIG. 2b, FIG. 2a and FIG. 2b illustrate the principle of the one-way vision window system of the present invention. The light valve device 3 is a polymer-dispersed liquid crystal with very short response time, which the maximum switching frequency is up to 1000 Hz, and the indoor lighting 2 is LED. Also referring to FIG. 3, FIG. 3 shows the time sequence diagram of the control module 4 of the one-way vision window system 1. When the one-way vision window system is at the time point t1; the indoor lighting 2 turns on; the light valve device 3 is unpowered, the liquid crystal micelle 31 is in a scattered state of irregular arrangement, and the rays L1 of the indoor lighting 2 cannot pass through the light valve device 3, and the light valve device 3 present an opaque state. Therefore, even in the situation of brighter indoors and darker outdoors, the indoor scenes still cannot be seen from outdoors. When at the time point t2; the indoor lighting 2 turns off; the light valve device 3 is powered, the liquid crystal micelle 31 is in a transparent state of regular arrangement. The indoor lighting 2 does not emit any light. Even if there is only slightly rays L2 from darker outdoors, the rays L2 can still pass through the light valve device 3 into the indoors, so that the indoor people can still see the outdoor scenes. Further, because the human eye has an effect of persistence of vision, quickly switching the time point t1 and t2 by using the control module 4, which the switching frequency is greater than 60 Hz, can make the person feel like that the outdoor scenes can be seen by indoor people, and the indoor scenes cannot be seen by outdoor people simultaneously.

Figure 4:
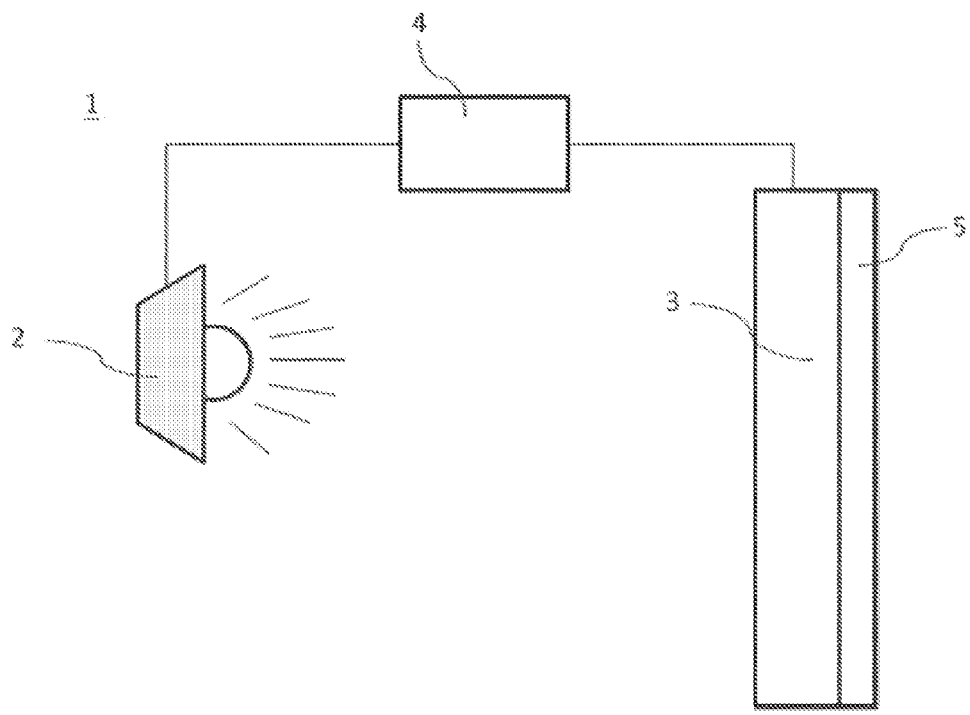
FIG. 4 shows the perspective views of the one-way vision window system of another preferred exemplary embodiment of the present invention.

Referring to FIG. 4, in still a preferred embodiment of the one-way vision window system of the present invention, the one-way vision window system 1 further includes a semi transflective layer 5 which disposed on the side of the light valve device 3 with respect to the indoor lighting 2. Therefore, when the light valve device 3 is switched to the transparent state in the daytime which outdoor light intensity is greater than the indoors, the indoors still has a one-way vision effect.

In further another preferred embodiment of the one-way vision window system of the present invention, the semi transflective layer 5 is a metal thin-film layer, a glass beads layer or a high reflective porous layer. Therefore, the light reflectance of the outdoor side of the light valve device 3 is greater than light transmittance thereof to reach the anti-peeping effect from outdoor people.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A one-way vision system comprising:
    an indoor lighting;
    a light valve device; and
    a control module electrically connecting to the indoor lighting and the light valve device, and synchronously controlling power switch of the indoor lighting and switching frequency of the light valve device, wherein the switching frequency is in a range of 60 Hz to 1000 Hz, and when the indoor lighting turns on, the light valve device is in an opaque state; when the indoor lighting turns off, the light valve device is in a transparent state.

2. The one-way vision system according to claim 1, wherein the light valve device is a polymer-dispersed liquid crystal device, a polarizing dimming device or a refractive dimming device.

3. The one-way vision system according to claim 1, wherein the indoor lighting is light emitting diode (LED) or organic light emitting diode (OLED).

4. The one-way vision system according to claim 1, further comprising a semi transflective layer which disposed on a side of the light valve device with respect to the indoor lighting.

5. The one-way vision system according to claim 4, wherein the semi transflective layer is a metal thin-film layer, a glass beads layer or a high reflective porous layer.

* * * * *